Patented Jan. 30, 1923.

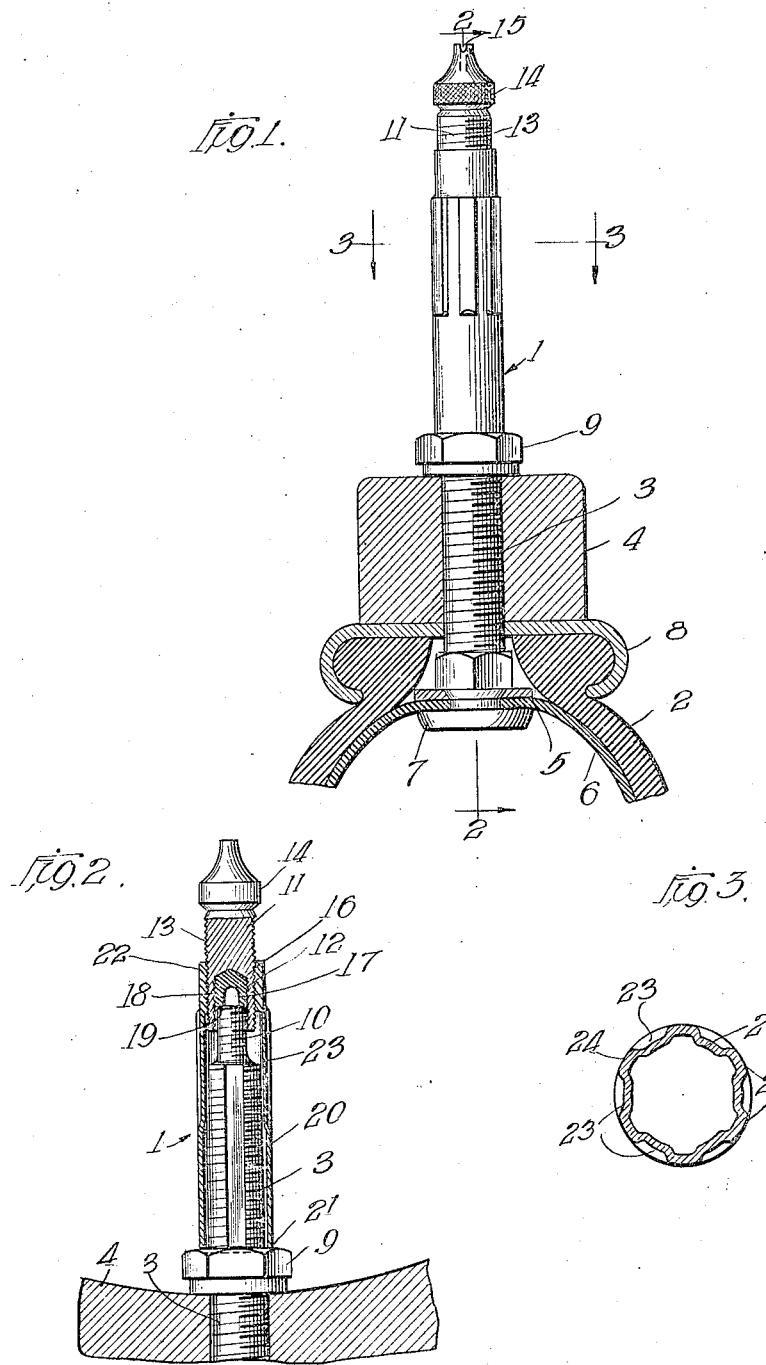

1,443,429

UNITED STATES PATENT OFFICE.

HARLEY A. OGLE, OF CHICAGO, ILLINOIS.

COMBINED VALVE AND DUST CAP.

Application filed June 6, 1921. Serial No. 475,205.

*To all whom it may concern:*

Be it known that I, HARLEY A. OGLE, a citizen of the United States, and resident of Chicago, in the county of Cook and State of Illinois, have invented certain new and useful Improvements in a Combined Valve and Dust Cap, of which the following is a specification.

My invention relates to improvements in valves for pneumatic tires and has special reference to improvements in dust caps for such valves.

By means of my invention I provide a positive lock for the dust cap; I provide a cap that can be very quickly applied and removed; and I provide one which will positively pack the stem against the leakage of air even though the valve in the stem should leak.

Instead of threading the cap upon the outer threaded surface of the valve stem, which is the usual manner of attaching a dust cap, and which does not provide a lock for the dust cap, I provide the valve stem closer with an external threaded surface of a different pitch than that at the extremity of the valve stem and I thread the outer end of my dust cap upon this outer threaded surface. The difference in the pitch effectually locks the cap against jarring loose once it has been set.

A further feature of my invention relates to an improved packing washer which I provide. To avoid the destruction of the washers and also to avoid any necessity of anti-friction devices I make a cup-like washer of such material that it will slide upon and not stick to the bearing surface of the valve stem against which it is forced by the cap. The cup-like shape provides relatively thin walls which although the material is relatively hard, lends yieldability to the washer so that the applied pressure will readily produce a tight closing contact of the washer with the stem.

My invention will be more readily understood by reference to the accompanying drawing forming part of this specification, and in which:—

Figure 1 is a fragmentary sectional view showing a pneumatic tire equipped with a valve and cap made in accordance with my invention;

Figure 2 is a central longitudinal sectional view of the stem and cap on the line 2—2 of Figure 1; and Figure 3 is a cross-sectional view of the cap on the line 3—3 of Figure 1.

In said drawings 1 designates generally a valve with its stem which is adapted to be used in connection with a pneumatic tire 2, the stem 3 is long enough to project through the felly 4 of the wheel to which the tire is applied and the stem is threaded throughout its length so that a clamping nut 5 can be run down the stem to clamp the inner tube 6 between the nut and the inner head 7 on the stem in the usual manner.

In mounting a tire on a wheel, the tire is placed on a suitable rim 8 the valve stem being projected through a suitable hole in the rim and a similar hole in the felly and projects inwardly between the spokes of the wheel. Usually the stem is long enough to project far enough in towards the center of the wheel so that the connection for the pump, for the purpose of pumping up the tire, can be readily secured to the inner end of the stem. The stem is adapted to be clamped in the felly by a nut 9 adapted to be run on to the stem from its inner end and bear against the inner face of the felly. The full length of the stem is often necessary as it is often difficult to project the stem through the holes in the rim and felly far enough to be able to start the nut 9 upon the inner end of the stem for the purpose of drawing the stem through and properly keeping it in the rim. The outer end of the stem is usually reduced in diameter and externally threaded as shown at 10 for the purpose of receiving the cap for sealing the outer end of the stem. It is to be understood that within the stem the usual check valve is arranged to hold the air in the tire. The usual arrangement is to have a small cap which screws upon the outer end of the stem and a dust cap which is large enough to cover this cap and the stem, the dust cap being screwed down upon the outer projecting end of the stem until it contacts with the nut 9.

Instead of the usual form of cap, I make an elongated cap which I thread internally at 12 to fit upon the reduced free end of the stem and also externally threaded as at 13 for a purpose to be explained. The outer end of the cap is provided with a knurled collar 14 for convenience in screwing the cap on and off and the extreme outer end is reduced in diameter and provided with a notch 15 similar to that usually provided in valve caps for operating the valve within the stem when it is desired to unseat same.

In place of the usual relatively soft packing washer which is made use of in the valve cap for sealing the outer end of the valve stem I provide a sealing washer 16 which I preferably make of a relatively hard vulcanized material such as fibre and which is yet somewhat yielding and I make this washer hollow as shown at 17 providing a central opening in the washer from the under side but not projecting clear through the washer. This provides relatively thin walls for the washer which adds to its yieldability, the inner edge of this washer is adapted to contact with the extreme outer end 19 of the valve stem and seal same against the escape of air.

A further advantageous feature of the peculiar packing washer which I use is that the washer being relatively hard turns freely upon the outer end of the stem without abrading same and there is no tendency to start the cap back as is the case with soft packing washers commonly employed.

The dust cap proper which I provide consists of an elongated tubular member 20 of a size to slide freely over the valve stem 3 and long enough to be seated on the outer surface of the lock nut 9 as shown at 21 and to project out from the nut to receive the cap 11. I reduce the diameter of the outer end of the tube as shown at 22 and internally thread it to receive the valve cap. For the purpose of finger grips, in order that the tube 20 may be easily rotated, I provide the outer end thereof with longitudinal grooves 23 providing longitudinal ribs 24. As this end of the tube is somewhat removed from the felly it is in position so that it can be readily grasped by the fingers, the spaces between the spokes being more at this point than at the hub. The standard thread for the outer end of the valve stem and the valve cap is 30 threads to the inch $\frac{5}{16}$ inch in diameter and I preferably make the cap of an external diameter of $\frac{7}{16}''$ and make the pitch of the external thread 13 of the cap 24 threads to the inch. This difference in pitch of internal and external threads of the cap is of importance in locking the cap and the tubular member in place for the reason that the least retrograde movement of the cap will tend to tighten the tube in place once the member has been set upon the valve stem. The preferable manner of placing the cap and tube upon the stem is to screw the cap into the tube not quite far enough to seat the tube when the cap is seated, then to seat the cap upon the stem and thereafter to screw down the tube and seat it upon the nut 9 thus effectually locking both the tube and the cap to prevent either of them jarring loose.

In removing the dust cap, I first back off the tubular member enough to free it from the nut 9 and then by grasping the knurled collar 14, the cap can be readily loosened. The cap is not readily lost as frequently occurs with the usual separate cap, as I leave the cap and tube together. I preferably make the cap relatively long so as to allow for adjustment of the tubular member to fit different thicknesses of fellies.

As many modifications of my invention will readily suggest themselves to one skilled in the art, I do not limit or confine my invention to the specific details of construction and operation herein shown and described except within the scope of the appended claims.

I claim:

1. In a dust protector for the valve stem of a valve for a pneumatic tire, a tubular member adapted to slide freely over the stem and be seated at its inner end against a shoulder surrounding the stem, the stem having a reduced externally threaded outer end, a cap for the stem internally threaded to fit the reduced end of the stem, a packing washer within the cap, the cap externally threaded and the tubular member reduced at its outer end and internally threaded to fit the cap, the pitch of the external thread on the cap being greater than that of the internal thread.

2. A packing washer for the purpose described of cup-like form of sufficient hardness to slide under pressure on the end of a valve stem, the open end of the cup presented to the valve stem, the wall of the cup being thin enough to provide sufficient yieldability for the purpose described.

Signed at Chicago, Illinois, this 1st day of June, 1921.

HARLEY A. OGLE.